United States Patent
DeBisschop

(10) Patent No.: US 6,383,081 B1
(45) Date of Patent: May 7, 2002

(54) SPIDER FOR USE IN A COMPACT UNIVERSAL JOINT ASSEMBLY

(75) Inventor: James G. DeBisschop, Morris, CT (US)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/562,859

(22) Filed: May 1, 2000

(51) Int. Cl.$^7$ ................................................. F16D 3/16
(52) U.S. Cl. ........................................ 464/114; 464/905
(58) Field of Search ............................... 464/112, 113, 464/114, 117, 118, 119, 128, 132, 130, 116, 134, 136, 905

(56) References Cited

U.S. PATENT DOCUMENTS

| | | | |
|---|---|---|---|
| 991,807 A | * 5/1911 | Spade | 464/112 |
| 1,167,455 A | * 1/1916 | Watts | 464/112 |
| 1,204,190 A | * 11/1916 | Rhodes | 464/112 |
| 1,271,616 A | * 7/1918 | Ranger | 464/112 |
| 2,813,409 A | * 11/1957 | Wolcott | 464/112 |
| 2,991,634 A | 7/1961 | Daley, Jr. | |
| 2,997,864 A | * 8/1961 | Rueb | 464/112 |
| 3,029,618 A | 4/1962 | Bouchard et al. | |
| 3,103,798 A | * 9/1963 | Piatti | 464/112 |
| 3,177,685 A | * 4/1965 | Piatti | 464/112 |
| 3,267,696 A | * 8/1966 | Sieja | 464/112 |
| 3,300,258 A | * 1/1967 | Kompanek, Jr. et al. | 464/112 |
| 3,306,077 A | * 2/1967 | Piatti | 464/112 |
| 3,800,383 A | * 4/1974 | Khambatta et al. | 29/148.4 |
| 3,975,922 A | * 8/1976 | Orain | 464/112 |
| 4,365,488 A | * 12/1982 | Mochida et al. | 464/132 |
| 4,650,439 A | 3/1987 | Mayhew | |
| 4,846,763 A | * 7/1989 | Di Stefano | 464/136 |
| 4,997,407 A | 3/1991 | Kretschmer et al. | |
| 5,201,107 A | 4/1993 | Mazziotti | |
| 5,433,667 A | 7/1995 | Schafer et al. | |
| 5,525,110 A | * 6/1996 | Riccitelli et al. | 464/118 |
| 5,593,084 A | 1/1997 | Harz et al. | |
| 5,649,778 A | * 7/1997 | Lin | 464/136 |
| 5,816,926 A | 10/1998 | Lynch et al. | |
| 5,820,467 A | 10/1998 | Fevre et al. | |
| 5,823,881 A | 10/1998 | Cornay | |
| 5,954,586 A | * 9/1999 | Kirson | 464/125 |
| 6,162,126 A | * 12/2000 | Barret et al. | 464/134 |

FOREIGN PATENT DOCUMENTS

EP        0 160 319 A2    11/1985

* cited by examiner

Primary Examiner—Lynne A. Browne
Assistant Examiner—Kenn Thompson
(74) Attorney, Agent, or Firm—John C. Bigler; Robert F. Palermo

(57) ABSTRACT

A spider for use in a compact universal joint, includes a spider body having a hollow cylindrical portion and two opposed tenons projecting radially outward from the hollow cylindrical portion along a common axis. The hollow cylindrical portion is adapted for installation of bearings therein for pivotal support of the cross body on a pin mounted in a first yoke of the universal joint, and the tenons are adapted for mounting within bearings in a second yoke thereof.

5 Claims, 5 Drawing Sheets

SPIDER FOR USE IN A COMPACT UNIVERSAL JOINT ASSEMBLY

BACKGROUND OF THE INVENTION

This invention relates generally to universal joints and more particularly to cross and bearing assemblies for use in single and double cardan constant velocity universal joints as are used in automotive steering columns and other mechanical applications.

A common single cardan universal joint has two yokes, each of which has two ears with transverse bearing bores at a first end and a shaft attachment means at a second end for connection to some drive source such as a steering wheel or an automotive transmission and a driven object such as a steering gear or an automotive differential. The yokes are connected together by a cross and bearing assembly which consists of a body, commonly referred to as a spider or cross, with first and second orthogonal axes defined by four tenons projecting from a center portion outwardly on the axes.

The single cardan universal joint is assembled by fishing the tenons of the first axis of the spider into the bearing bores in the ears of one yoke, as seen in FIG. 5a, and pressing bearings into the bearing bores to fit over the tenons of the spider and to thereby position the spider both radially and axially in the yoke while permitting the spider to rotate within the yoke. The ears of the yoke must have bearing bores large enough and must be separated by a sufficient distance to permit the spider to be tilted enough to permit the tenons of the spider to be fished into the bearing bores. The universal joint is completed by repeating the assembly process on the second yoke and the tenons of the second axis of the spider. The resulting universal joint assembly is capable of flexing about the two orthogonal axes of the spider, or cross, which joins the two yokes together.

To provide constant velocity smooth rotary motion between shafts which lie in a common plane but have centerlines that are angularly displaced from each other, double cardan constant velocity joints are used. These consist of two single cardan universal joints, as described above, with a center housing substituted for the second yoke in each joint and a centering ball and socket added to the proximal ends of the first and second yokes, respectively. (Proximal with respect to the center housing.) The centering ball and socket assures that the angular misalignment between the two shafts will be equally divided about the center housing. The center housing has two pairs of bearing bores in ears at opposite ends, each pair of bores being aligned on an axis which is parallel to the axis of the other pair. The double cardan joint is assembled by attaching one pair of tenons of each of the two spiders to the ears at opposite ends of the center housing. This is usually done by pressing bearings on the tenons in the bearing bores of the ears of the center housing. The remaining tenons of each spider are attached to a yoke which is connected to a driving or driven member.

When used in automotive steering columns, both double cardan constant velocity joints and single cardan joints are difficult to install and connect because of the very limited space and visibility available under the dashboard and between the dash panel and the steering gear box. Because the ears of the yoke and center housing must support the bearings in which the tenons are pivoted, they must necessarily be thick enough that the bearings cannot rock when installed. They must also be wide enough to provide sufficient radial support for the bearing under the heaviest anticipated loads. This requires larger heavier yokes.

The added thickness and width requirements also extend to the ears of center housings of double cardan joints. Moreover, the diameter of the center housing must be larger to accommodate the greater thickness of the yokes and their ears. These requirements add to the weight and cost of the cardan joints and to the difficulty of fitting the cardan joints into the cramped quarters afforded by automotive design. Thus, the structural limitations imposed by the spider result in a size, weight, and cost penalty to the design of the automobile.

The foregoing illustrates limitations known to exist in present single and double cardan constant velocity joints for Use in automotive steering columns. Thus, it would clearly be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a spider for use in a compact universal joint, said spider comprising a spider body having a hollow cylindrical portion and two opposed tenons projecting on a common axis radially outward from said hollow cylindrical portion, said hollow cylindrical portion being adapted for installation of bearings therein for pivotal support of said cross body on a pin mounted in a first yoke of said universal joint, and said tenons being adapted for mounting within bearings in a second yoke thereof.

The foregoing and other aspects will become apparent from the following detailed description of the invention when considered in conjunction with the accompanying drawings.

DETAILED DESCRIPTION

Figure 1:
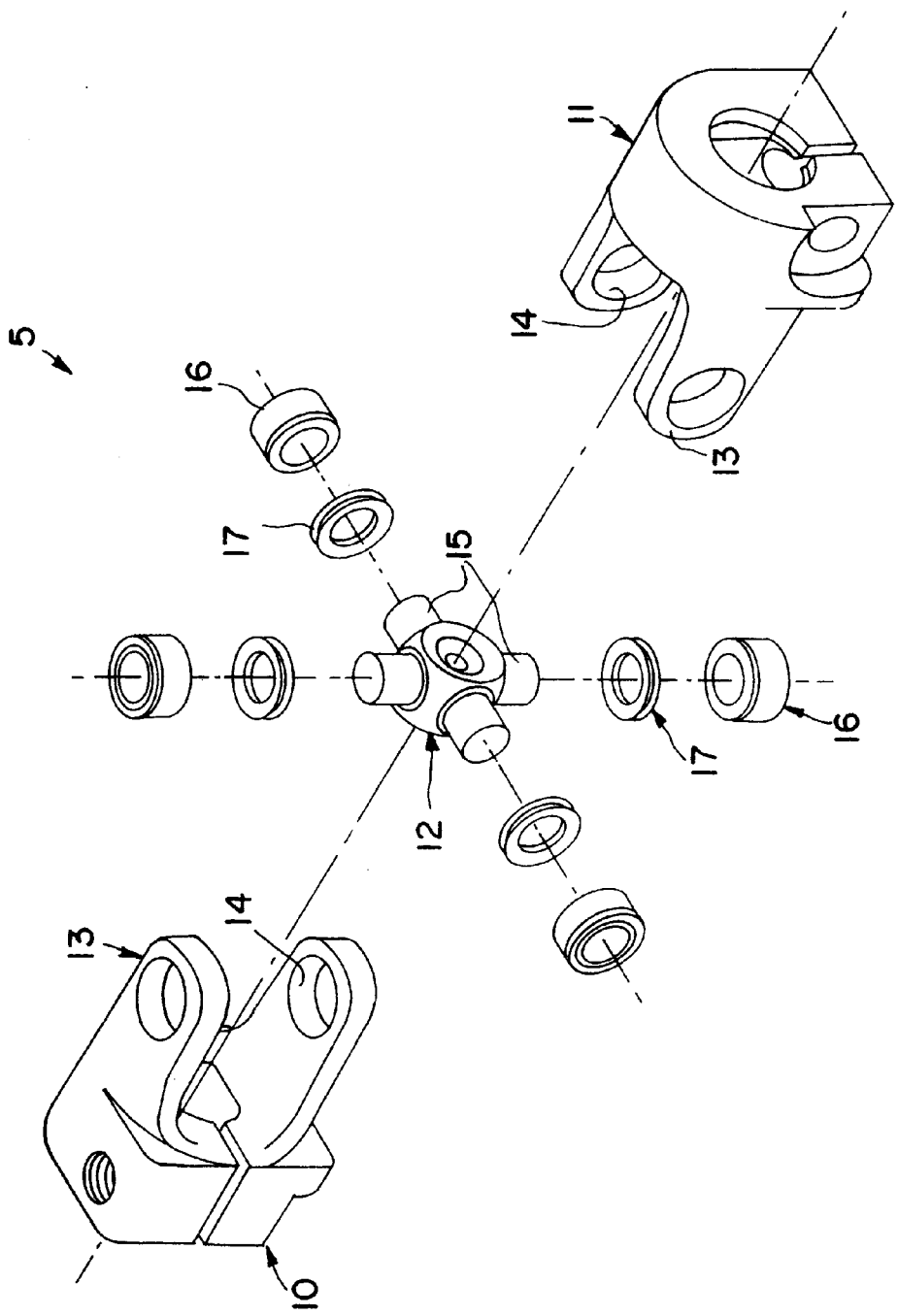
FIG. 1 is a schematic exploded perspective view of a common universal joint showing a cross and bearing assembly of the prior art.

FIG. 1 shows a schematic exploded view of a simple single cardan (universal) joint 5 of the prior art which is assembled as described above. It includes a first yoke 10 and a second yoke 11, each of which has two ears 13 with bearing bores 14 for supporting bearings, and a cross and bearing assembly. The cross and bearing assembly includes a cross body or spider 12, which may be formed by any of several well known methods and which has four cylindrical tenons 15 projecting outwardly from the cross body on two orthogonal axes. Bearings 16 and seals 17 are provided for the tenons 15 for attachment in the bearing bores 14 of the yoke ears 13 to provide a reduced-friction coupling. In this design, the bearings 16 are supported in the bearing bores of the ears 13, which must be sufficiently thick and sufficiently wide to support the bearings under load without permitting them to rock within the bore. Although this results in an excellent universal joint, it is a relatively large, heavy, and costly joint which is difficult to assemble into automotive steering shafts in the cramped installation space available.

Figure 2:
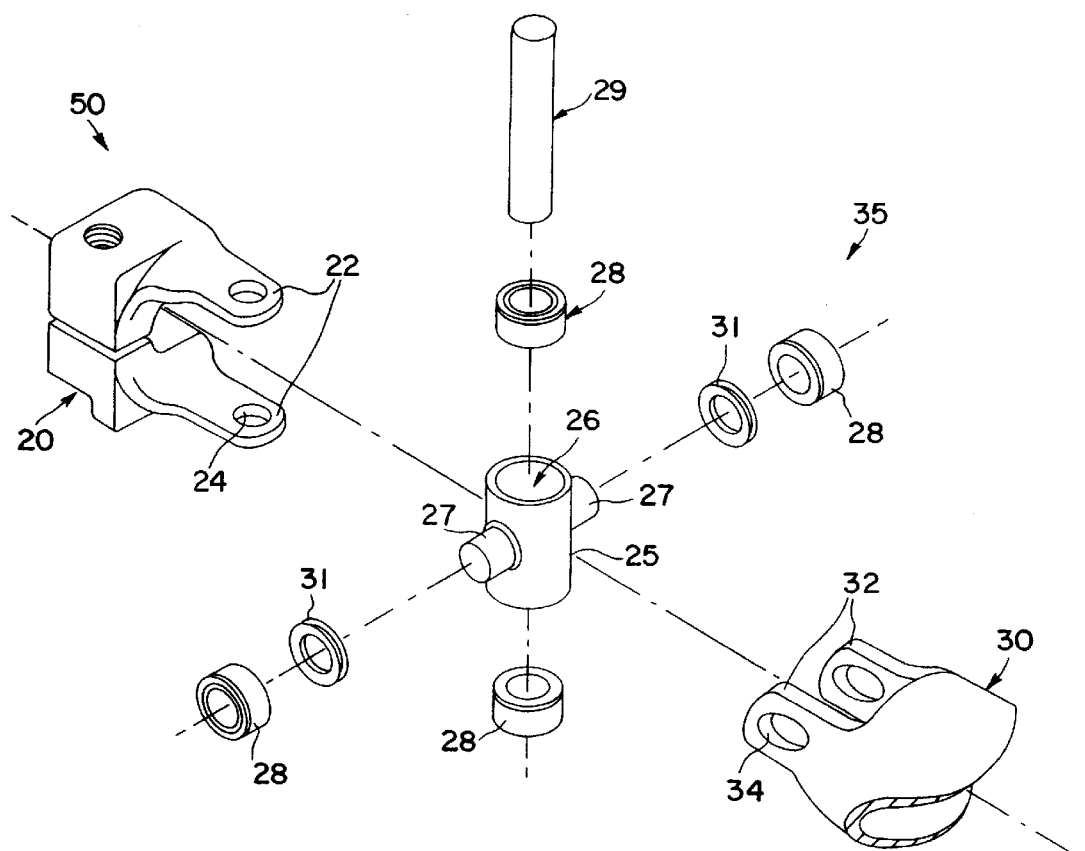
FIG. 2 is a schematic exploded perspective view of a universal joint Including a compact cross and bearing assembly according to the invention.

FIG. 2 shows a universal joint 50 made with a compact cross and bearing assembly 35 according to the invention. In this case, yoke 20 has two ears 22 with cylindrical bores 24 on a common transverse axis. Yoke 30 also has ears 32 with cylindrical bores 34 on a common transverse axis, but it should be noted that the diameters of bores 24, of yoke 20, are smaller than are those of bores 34 of yoke 30. Bores 24 are sized to fit pin 29, while bores 34 are sized for bearings 28. Pins 29 fit within bearings 28, which, in turn, fit within the bore 26 of the hollow cylindrical portion of the cross body 25. The axial length of the bore 26 of the hollow cylindrical portion is only long enough to accommodate the bearings 28 and seals 31. Thus, ears 22 only need to be separated enough to span the length of the hollow cylindrical portion of the cross 25 which slides between the ears without the need for tilting. Since the pins 29 are installed through the bores 24 into the bearings 28 in the already aligned cross bore 26, there is no need to provide the added separation required for fishing the trunnions 27 into the bores 34 of the ears 32. Seals 31, only two of which are shown, are provided to retain lubricant within the four bearings 28 and to exclude contamination. The seals may be eliminated if sealed bearings are used. By using the pin 29, the width and thickness of the ears 22 may be reduced since there is no tendency of the stationary pins to rock within the ears. This permits fabrication of the yoke from thinner gauge, lighter weight, and less costly material, resulting in a smaller envelope for the ears of the yoke 20 and a more compact universal joint. It should be noted that only a single bearing 28, of greater length than those of the Fig., may be used in the cross bore 26 if the design load permits.

Figure 3:
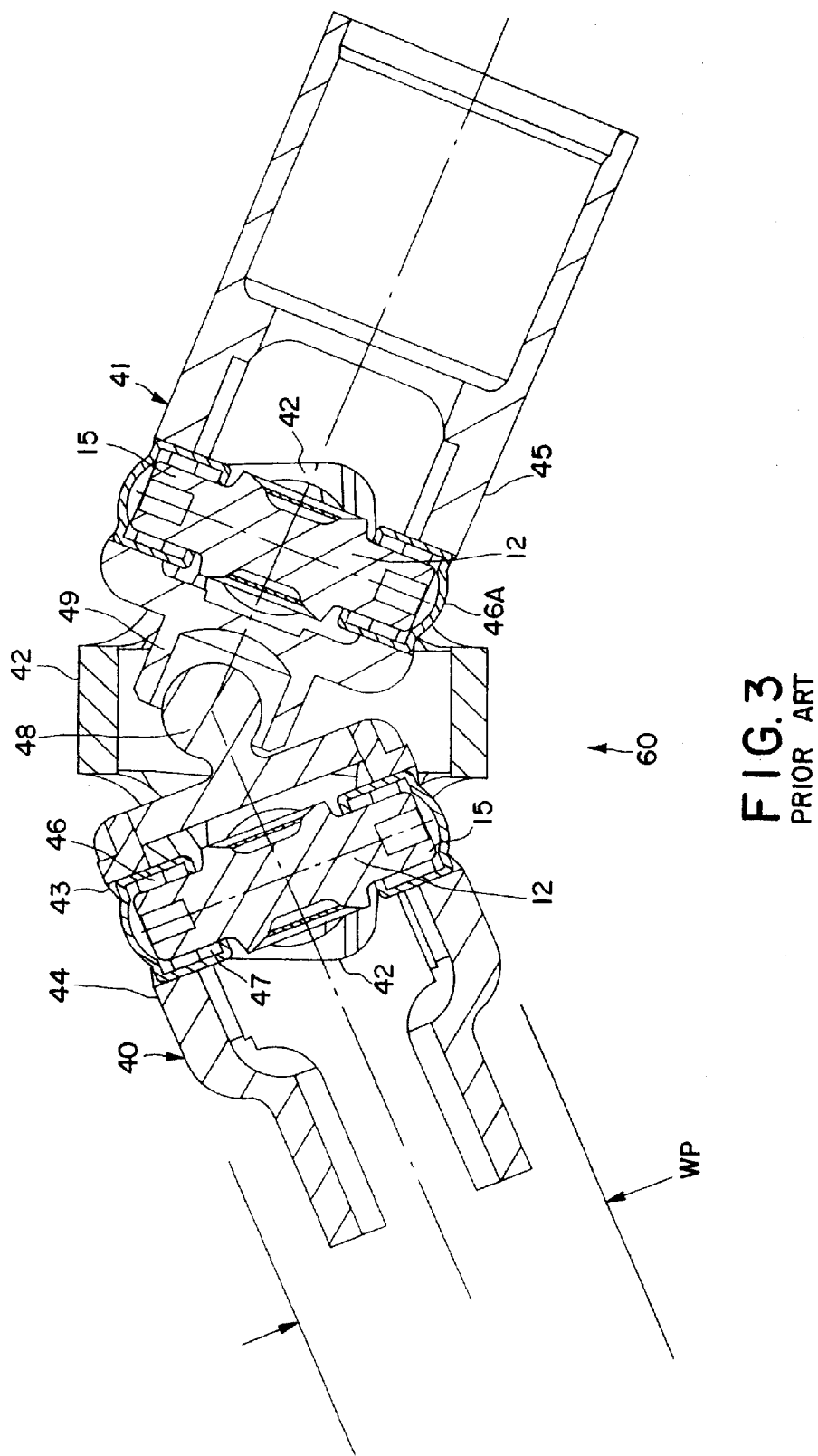
FIG. 3 is a schematic sectional view of a double cardan constant velocity joint of the prior art.
Figure 4:
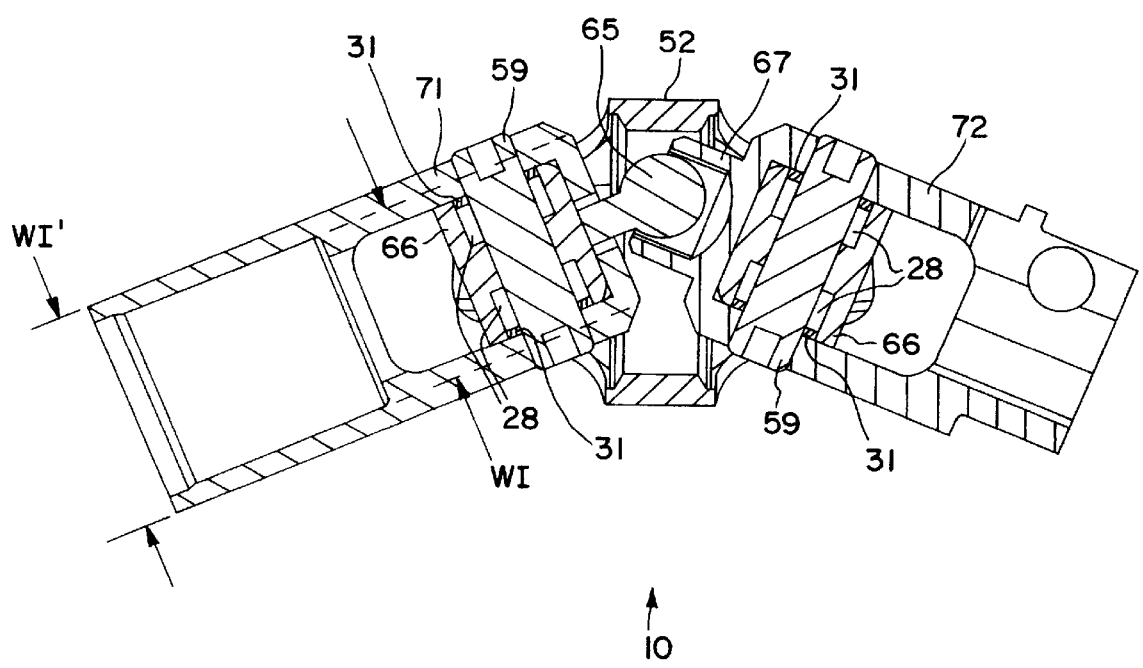
FIG. 4 is a schematic sectional view of a double cardan constant velocity joint using a spider made according to the invention.

In double cardan constant-velocity (DCCV) joints, as seen in FIGS. 3 and 4, the compactness permitted by the invention is more obvious. The prior art DCCV joint 60 of FIG. 3 has two yokes 40, 41 with sidewalls 44, 45, a center housing 42, and a centering ball 48 and a centering socket 49 extending from the yokes to interengage within the center housing. The spiders 12 have tenons 15, pivotally supported by bearings 46 with bearing caps 46A and seals 47 which are pressed into the yoke sidewalls 44, 45. FIG. 3 thus illustrates the larger ear size, both thickness and width, of yokes 40, 41 which are dictated by the requirements for bearing support and fit within the yoke sidewalls 44, 45. This results in a yoke width WP for the prior art DCCV joint 60 which requires a larger center housing 42 to accommodate the larger yokes 40, 41 during rotation and articulation of the joint. The ears of the center housing 42 are mostly hidden by the yokes 40, 41 but must be as thick and wide as the sidewalls 44, 45 of the yokes in order to provide the same stable bearing support as the yokes. The thick wall requirement of the center housing resulting from the need for this support is clearly seen in FIG. 3. Note that the tenons on both axes of the cross body 12 of the prior art are of equal length, thus the outside width of the ears of the center housing must be at least as large as WP, and the thickness must be the same as that of the sidewalls 44, 45 of the yokes to provide equal support to the bearings.

FIG. 4 shows a DCCV joint 70 made using the compact spider of the invention, which, as was illustrated in FIG. 2, allowed reduction of the width of ears 22; because use of the spider 25 of the invention eliminates the need for bearings within the ears to support the pin 29. Joint 70 consists of two yokes 71, 72 which are joined by a center housing 52. The pins 59 are pressed into the sidewalls of the yokes 71, 72 and through the bearings 28 and seals 31, if required, which are fitted in the hollow portion 66 of the spider body of the invention in carriers 58. Note that the carriers 58 are only an option for handling the bearings and seals and may be dispensed with using other handling techniques, especially when using a single sealed bearing. The tenons of the other axis, which are unseen in this figure, are similar to those of the prior art in FIG. 3 and are similarly installed in the ears of the center housing 52. During rotation in a non-aligned condition, the yokes 71, 72 pivot on the pins 59 about the ears of the center housing 52, and on the (unseen) tenons between the ears of the center housing. The ears of the yokes 71, 72 of the invention are thin and narrow, as described above, and are easily accommodated by the compact center housing. The compact design of the DCCV joint permitted by the spider of this invention results in yokes 71, 72 and a center housing 52 which can be fitted into a small operating envelope.

The widths of the yokes 71, 72, permitted by the stationary pins 59 of the invention, can be as small as "WI" in FIG. 4; but, even without thinning the sidewalls, the yokes can be made as small as "WI'". Both options permit use of a smaller center housing 52.

Figure 5B:
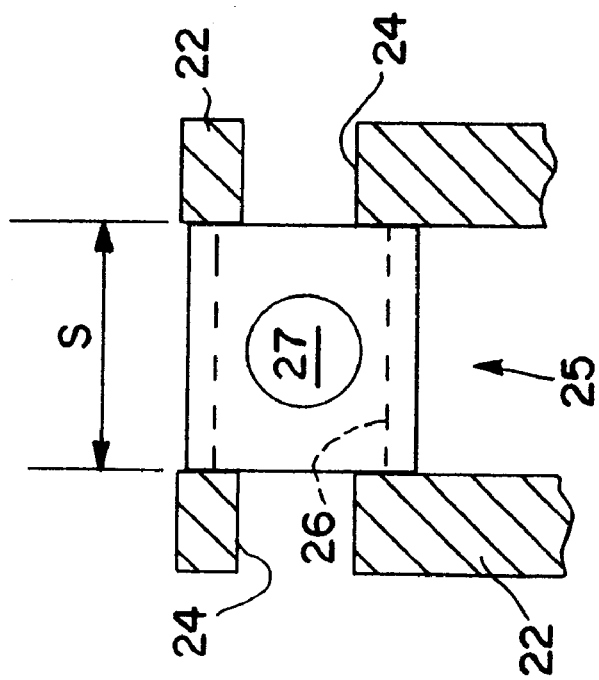
FIGS. 5a and 5b illustrate the difference in space required for threading standard trunnions into bearing bores in the ears of a yoke and the straight sliding insertion of the hollow cylindrical portion of the spider of the invention.
Figure 5A:
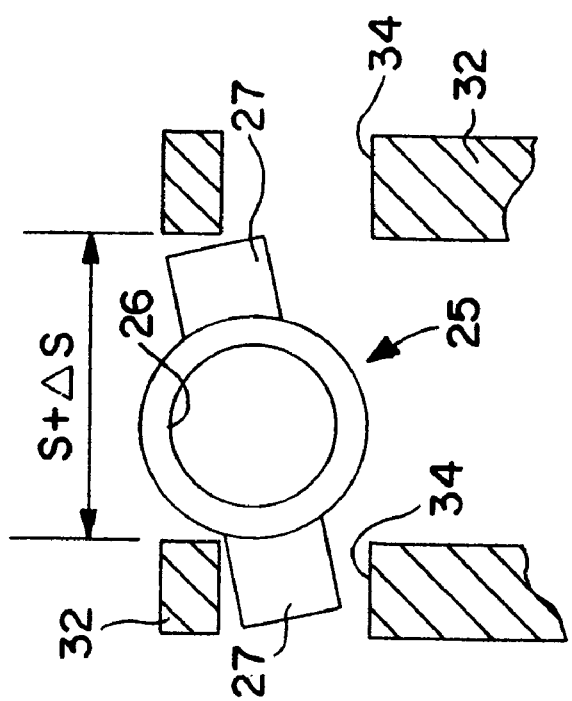

FIGS. 5a and 5b illustrate how fishing the tenons 27 into the bearing bores 14 of the yoke ears 13 requires greater separation "S+ΔS" between the ears than does the straight translation permitted by the hollow member with its installed bearings. The spider 25, in FIG. 5a, must be tilted sufficiently to permit insertion of one tenon 27 into the bearing bore 14 of one ear 13 and then must be swung in so that the other tenon aligns with the opposite bore. It is clear that the ears 13 must be far enough apart for the end of the second tenon 27 to pass the ear as it is swung into alignment and that the bearing bores 14 must be large enough to permit insertion of the tenon at an angle. The hollow member of the spider 25 has a length S and is inserted, as shown in FIG. 5b, by sliding it directly between the ears 22 without the need for tilting the spider. The length S of the hollow member need only be enough to accommodate a bearing of sufficient length to carry the: design service load of the universal joint. This allows the ears 22 to be spaced by only S, which is ΔS less than ears 32 of FIG. 5a and permits smaller and narrower ears and yokes, thereby reducing the size and weight requirements in the steering system of the vehicle.

Having described the invention, I claim:

1. A spider for use in a compact universal joint, said spider comprising:

a spider body having a hollow cylindrical portion and two opposed tenons projecting radially outward from said hollow cylindrical portion along a common axis, said hollow cylindrical portion being adapted for mounting at least one rolling element bearing therein for pivotal support of said spider body, on a pin mounted in a first yoke of said universal joint, and said tenons being adapted to receive rolling element bearings mounted in a second yoke thereof.

2. A compact spider and bearing assembly for use in a universal joint, comprising:

a spider body having two opposed tenons projecting on a common axis transversely outward from a hollow cylindrical portion;

rolling element bearings fitting over said tenons;

at least one rolling element bearing fitting within said hollow portion; and a pin for installation in the bearings fitted within the hollow portion.

3. The compact cross and bearing assembly of claim 2, wherein the bearing means for fitting within said hollow portion of said spider body comprises a single-bearing member having an axial length proportional to an anticipated bearing load in the intended service of the universal joint.

4. A universal joint, comprising:

a first yoke having a shaft connection at a first end and two opposed ears at a second end, said ears having coaxial radial bores therein;

a second yoke having a shaft connection at a first end and two opposed ears at a second end, said ears having coaxial radial bores therein;

a spider body having two opposed tenons projecting on a common axis transversely outward from a hollow cylindrical portion;

rolling element bearings fitting within the coaxial radial bores of said first yoke and over the tenons of said spider body;

at least one rolling element bearing fitting within the hollow portion of said spider body; and a pin extending through the coaxial radial bores in the second yoke to mount in the boaring fitted within the hollow portion of said spider body.

5. A compact double cardan constant velocity universal joint comprising:

a first yoke having a shaft connection at a first end and having an axially extending centering ball supported on two opposed sidewalls at a second end, said sidewalls having coaxial radial bores therein;

a second yoke having a shaft connection at a first end and having an axially extending centering socket supported on two opposed sidewalls at a second end, said sidewalls having coaxial radial bores therein;

a center housing having a hollow body with two pairs of opposed ears, one pair at each axial end, each said pair of ears having coaxial radial bores therein;

two spider bodies, each said spider body having two opposed tenons projecting on a common axis transversely outward from a hollow cylindrical portion;

at least one rolling element bearing fitting within the hollow portion of each of said two spider bodies;

two pins extending through the coaxial radial bores of said first and second yokes to mount in the bearings fitted within the hollow portions of said two spider bodies; and rolling element bearings fitting within the coaxial radial bores in the sidewalls of said center housing and over the tenons of said two spider bodies.

* * * * *